(12) United States Patent
Neystadt et al.

(10) Patent No.: US 7,953,969 B2
(45) Date of Patent: May 31, 2011

(54) REDUCTION OF FALSE POSITIVE REPUTATIONS THROUGH COLLECTION OF OVERRIDES FROM CUSTOMER DEPLOYMENTS

(75) Inventors: John Neystadt, Kfar Saba (IL); Efim Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 11/893,974

(22) Filed: Aug. 17, 2007

(65) Prior Publication Data

US 2008/0256622 A1 Oct. 16, 2008

Related U.S. Application Data

(60) Provisional application No. 60/923,662, filed on Apr. 16, 2007.

(51) Int. Cl.
*G06F 15/173* (2006.01)
*H04L 9/32* (2006.01)
(52) U.S. Cl. ......................................... 713/155; 709/225
(58) Field of Classification Search .................. 713/155; 709/225
See application file for complete search history.

(56) References Cited

U.S. PATENT DOCUMENTS

| 6,772,214 | B1 | 8/2004 | McClain et al. |
| 7,085,925 | B2 | 8/2006 | Hanna et al. |
| 7,174,454 | B2 | 2/2007 | Roskind |
| 7,203,753 | B2 | 4/2007 | Yeager et al. |
| 2003/0018585 | A1 | 1/2003 | Butler et al. |
| 2003/0126227 | A1 | 7/2003 | Zimmerman et al. |
| 2004/0122926 | A1 | 6/2004 | Moore et al. |
| 2006/0042483 | A1 | 3/2006 | Work et al. |
| 2006/0200487 | A1 | 9/2006 | Adelman et al. |
| 2006/0212931 | A1 | 9/2006 | Shull et al. |
| 2006/0253458 | A1* | 11/2006 | Dixon et al. ..................... 707/10 |
| 2006/0253578 | A1* | 11/2006 | Dixon et al. .................. 709/225 |
| 2006/0253579 | A1* | 11/2006 | Dixon et al. .................. 709/225 |
| 2006/0253580 | A1* | 11/2006 | Dixon et al. .................. 709/225 |
| 2006/0253581 | A1* | 11/2006 | Dixon et al. .................. 709/225 |
| 2006/0253582 | A1* | 11/2006 | Dixon et al. .................. 709/225 |
| 2006/0253583 | A1* | 11/2006 | Dixon et al. .................. 709/225 |
| 2006/0253584 | A1* | 11/2006 | Dixon et al. .................. 709/225 |
| 2006/0265760 | A1* | 11/2006 | Daemke et al. ................. 726/27 |
| 2007/0064626 | A1 | 3/2007 | Evans |
| 2007/0078699 | A1 | 4/2007 | Scott et al. |

OTHER PUBLICATIONS

Alunkal, Beulah Kurian, "Grid Eigen Trust a Framework for Computing Reputation in Grids", Date: Dec. 2003, Chicago, Illinois.

(Continued)

*Primary Examiner* — Christian LaForgia

(57) ABSTRACT

An automated arrangement for reducing the occurrence and/or minimizing the impact of false positives by a reputation service is provided in which overrides for a reputation of an adversary are reported to a reputation service from security devices, such as unified threat management systems, deployed in enterprise or consumer networks. An override is typically performed by an administrator at a customer network to allow the security device to accept traffic from, or send traffic to a given IP address or URL. Such connectivity is allowed—even if such objects have a blacklisted reputation provided by a reputation service—in cases where the administrator recognizes that the blacklisted reputation is a false positive. The reputation service uses the reported overrides to adjust the fidelity (i.e., a confidence level) of that object's reputation, and then provides an updated reputation, which reflects the fidelity adjustment, to all the security devices that use the reputation service.

17 Claims, 5 Drawing Sheets

OTHER PUBLICATIONS

Baker, et al., "Local Control over Filtered WWW Access", http://cm.bell-labs.com/who/bsb/papers/signet/Overview.html.

Kostoulas, Dionysios Konstantinos, "Distributed reputation-based mechanisms for trust propagation in large groups", Date: 2002, Urbana, Illinois.

Lik Mui et al., "A computational Trust Model of Confidence and Reputation", Proceedings of the 35th Annual Hawaii International Conference on System Sciences, pp. 2431-2439, Jan. 2002.

International Search Report in corresponding from PCT/US2008/057744 dated Jul. 31, 2008.

* cited by examiner

REDUCTION OF FALSE POSITIVE REPUTATIONS THROUGH COLLECTION OF OVERRIDES FROM CUSTOMER DEPLOYMENTS

STATEMENT OF RELATED APPLICATION

This application claims the benefit of U.S. Provisional Patent Application Ser. No. 60/923,662, filed Apr. 16, 2007, entitled "Reduction of False Positive Reputations through Collection of Overrides from Customer Deployments," which is incorporated herein by reference in its entirety.

BACKGROUND

The term computer "hacker" is increasingly used to refer to persons who engage in malicious or illegal activities to gain access to, or attack computer systems without authorization. Such activities by hackers have evolved far beyond those that were simply pranks or caused some minor inconveniences into a key component of highly organized criminal enterprises in which billions of dollars can be made each year.

Hackers often seek to launch attacks on computer systems in an automated manner by using large networks called "botnets" of compromised computers called "bots" (i.e., software robots) or "drones." While bots can be supported by hosts that bypass most local Internet content regulation (so called "bullet-proof hosts"), bots are primarily found in computers used by innocent home users who are completely unaware that their systems have been taken over and are being used for illegitimate purposes. Botnets are thought to be organized in herds as large as one hundred thousand to a half million or more bots that can be geographically spread over many countries.

Botnets can employ both active and passive attacks. In an active attack, a botnet originates attacking traffic such as spam, adware, or denial of service ("DoS") traffic which is sent over a network such as the Internet to its victims. In a passive attack, bots function as servers which, when accessed by a user, serve malware such as viruses, rootkits, trojan horses etc., typically using HTTP (Hypertext Transfer Protocol).

Reputation services have been established to address the problem of automated attacks and other hacker activities by compiling black lists of URLs (Uniform Resource Locators) and IP (Internet Protocol) addresses of known adversaries. A variety of technologies such as mail relay servers and firewalls can query the reputation service through an online connection to decide whether to accept traffic from, or send traffic to, a given computer on the Internet.

Current reputation services often run their own laboratories that are equipped with a variety of tools which are used to scan the Internet to locate adversaries and establish the reputation. These tools include web crawlers, honeypots (passive, dummy data or network sites that appear to contain information of value to attract attackers), honey monkeys (virtual computers that visit websites and seek code designed to attack a computer), virtual machines, and other global sensors.

Reputation services face several significant challenges that can affect their use and success in combating hackers. For example, reputation services must reliably detect and confirm adversaries that are deployed in vast numbers all over the world. Hackers can also change URLs and IP addresses of bots very quickly, so reputation services must be able to dynamically respond with equal speed so as not to block legitimate users who might reuse the same URL or IP address a few hours later. This problem of false positives in which URLs and IP addresses of innocent (i.e., non-malicious) computers are wrongly identified as adversaries can cause significant disruptions to users and result in high costs to service providers to resolve disputes and restore services.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An automated arrangement for reducing the occurrence and/or minimizing the impact of false positives by a reputation service is provided in which overrides for a reputation of an adversary are reported to a reputation service from security devices, such as unified threat management ("UTM") systems, deployed in enterprise or consumer networks. An override is typically performed by an administrator at a customer network to allow the security device to accept traffic from, or send traffic to a given IP address or URL. Such connectivity is allowed—even if the objects have a blacklisted reputation provided by a reputation service—in cases where the administrator recognizes that such blacklisted reputation is a false positive. The reputation service uses the reported overrides to adjust the fidelity (i.e., a confidence level such as low, medium, high etc.) of that object's reputation, and then provides an updated reputation, which reflects the fidelity adjustment, to all the security devices that use the reputation service. Alternatively if many overrides are sent for certain source, the reputation service can use this as an indication for the need to improve the algorithms used to detect the incidents.

In various illustrative examples, the reputation service verifies that the override is authenticated (e.g. signed with a non-revoked certificate or other cryptographic method) to thereby authenticate the source to ensure that a hacker cannot misuse overrides in attempt to improve its own reputation. Each reported override is assigned a time-to-live ("TTL") value that sets the length of the time the override is valid in order to deal with a hacker changing IP addresses and URLs of bots under its control.

The reputation service adjusts the fidelity of a given reputation according to the number of enterprises or customers reporting an override for the same reputation and sends an updated reputation to the enterprises and customers using the service. An increase in the number of multiple, distinct enterprises reporting valid overrides (i.e., those with an unexpired TTL) for same reputation will cause the fidelity of that reputation to be adjusted down (e.g., from high to medium) to reflect greater confidence that the override of that reputation is justified. That is, as more customers override a reputation, the confidence that a blacklisting is accurate goes down. The updated reputation that is generated in response to the reported overrides enables an enterprise or customer to allow traffic to and from legitimate computers which would otherwise be blocked as false positives.

Conversely, a decrease in the number of valid overrides will cause the reputation service to adjust the fidelity of the reputation up (e.g., from medium to high) to reflect less confidence in the overrides and more confidence that a blacklisting is correct.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Similar reference numerals indicate similar elements in the drawings.

DETAILED DESCRIPTION

Figure 1:
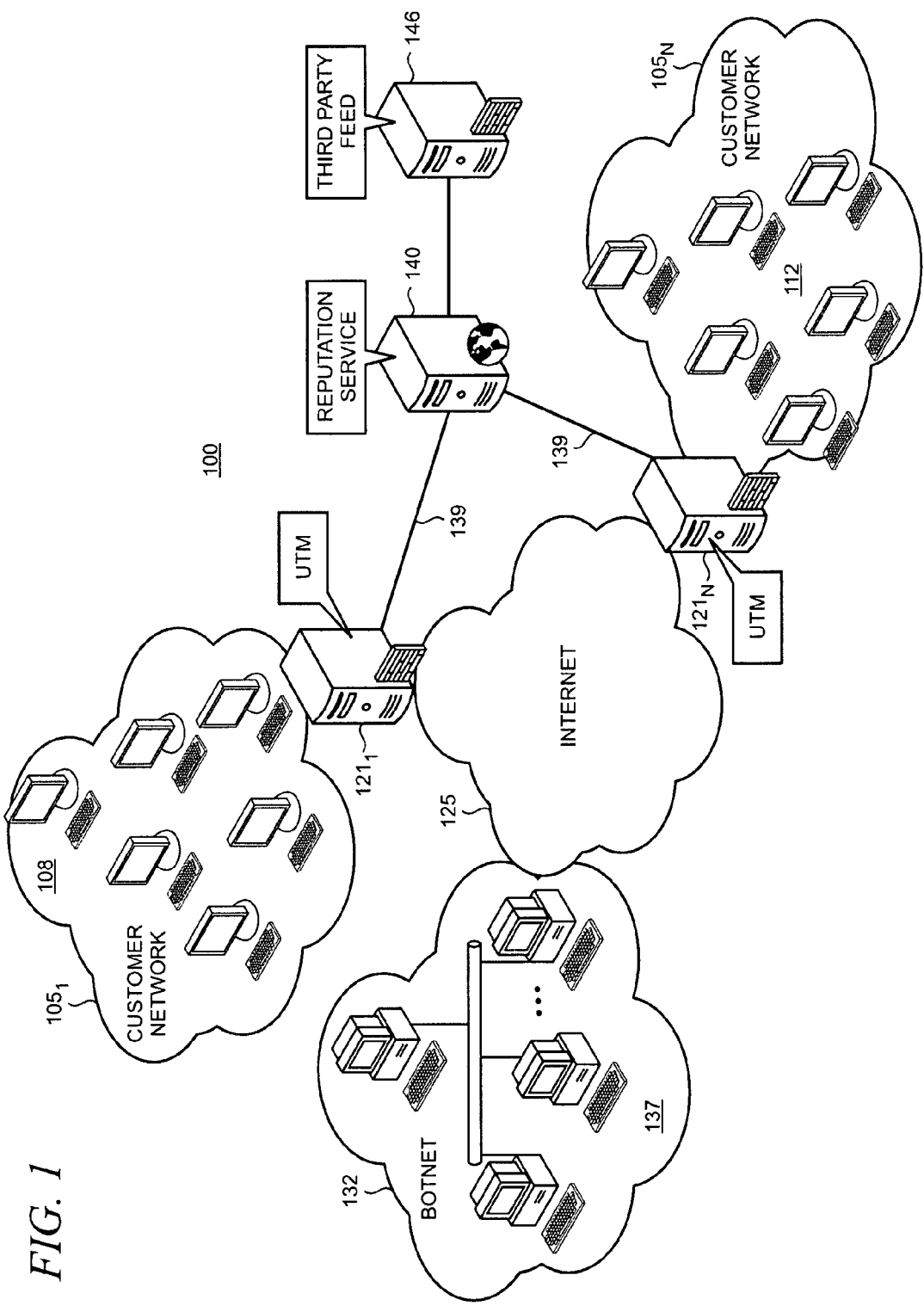
FIG. 1 shows an illustrative computer network environment in which the present arrangement for reduction of false positive reputations may be utilized.

FIG. 1 shows an illustrative computer network environment 100 in which the present arrangement for reduction of false positives by a reputation service through collection of overrides may be utilized. A number of enterprise or customer networks 105-1 . . . N are included in the environment 100. Customer network $105_1$, includes a number of hosts 108 and customer network $105_N$ includes hosts 112. Networks 105 are protected by UTMs 121-1 . . . N that perform a variety of functions to protect the hosts inside the networks 105 from external threats and adversaries, particularly those that are accessed via the Internet 125. UTMs are security products that are commonly built on edge or network firewall products that incorporate many features in a single product including, for example, e-mail filtering, anti-virus ("AV") and anti-malware ("AM") protection, and intrusion detection, along with traditional proxy-based (i.e., application-layer) firewall functions.

An illustrative botnet 132 comprises a herd 137 of compromised hosts, such as home computers with broadband connectivity. Botnet 132 typically uses the Internet 125 in its attempts to attack hosts inside the customer networks 105. Botnet herd 137 can include any number of compromised hosts and could number in the several hundred thousands or even millions. Botnet 132 is typically spread over the globe and can thus be very difficult to deactivate.

Figure 2:
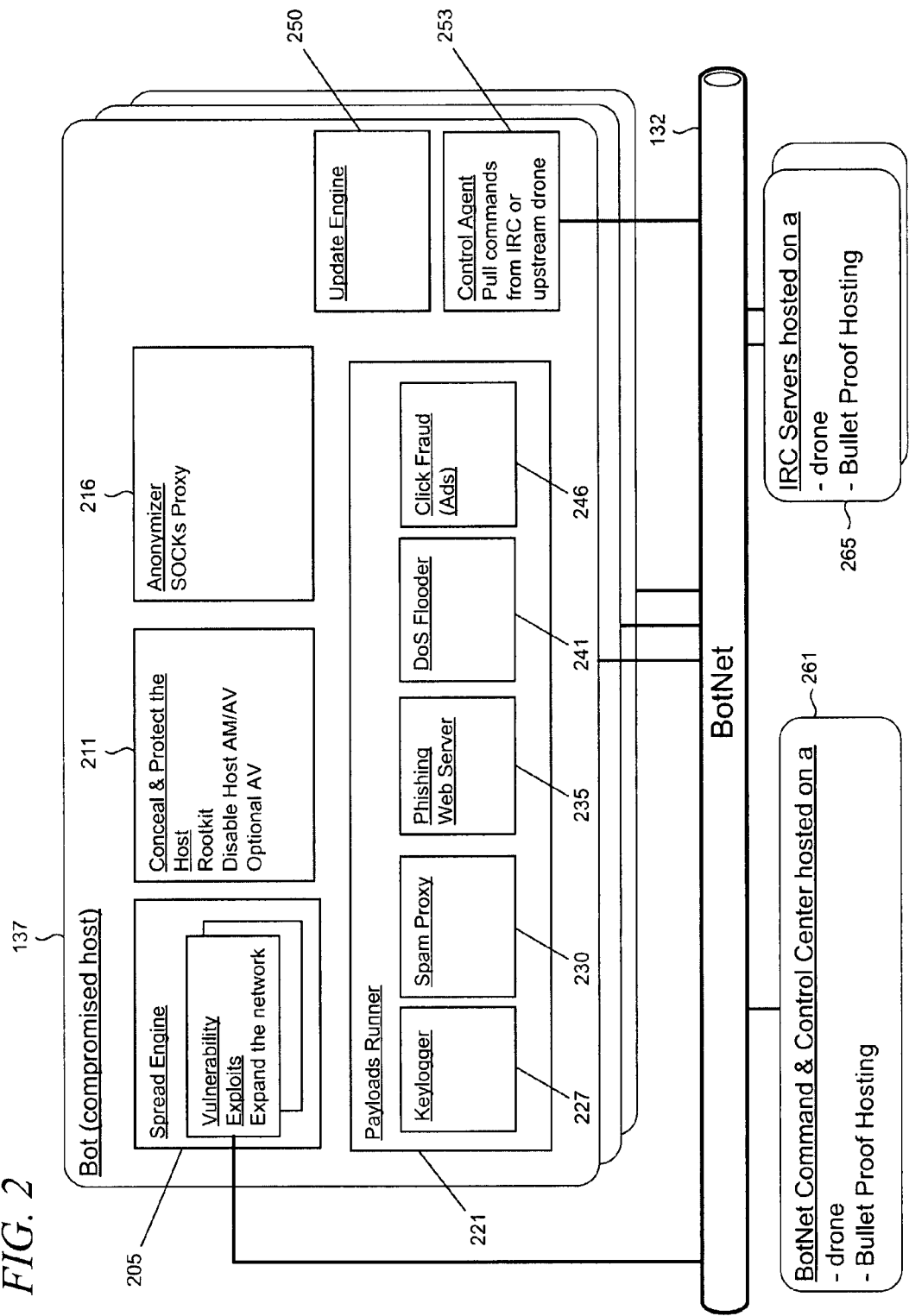
FIG. 2 shows functional components of an illustrative botnet.

Details of botnet 132 and herd 137 are shown in FIG. 2. Each comprised host is typically infected with malware which includes a number of functional modules, as shown. A spread engine 205 looks to expand the botnet further by attacking operating systems and applications on other hosts to exploit possible vulnerabilities. A concealment module 211 operates to conceal and protect the bot malware on the infected host by being configured as a rootkit that hides the bot's utilization of files, network connections, memory addresses, or registry entries to evade detection. Concealment module 211 may disable the host's anti-malware or anti-virus software. In addition, concealment module 211 may even install pirated anti-virus functionality in order to protect the host's takeover by another botnet. An anonymizer module 216 protects identifying information about the infected host from being revealed by using a SOCKS proxy server in order to transfer and retrieve data anonymously.

A payloads runner 221 includes a number of functional modules to carry out the malicious purposes of the botnet 132. These functional modules include a keylogger 227 that may be used for identity theft, a spam proxy 230 for sending spam, a back-end phishing web server 235 for hosting spoofed web sites, a DoS flooder 241 for supporting DoS for extortion or other attacks, and a click fraud module 246 that provides automated click throughs on web advertising in order to fraudulently gain per-click advertising revenue or reduce advertising costs by manipulating auctions.

An update engine 250 is arranged to keep the compromised host updated in order to dynamically reconfigure the host as may be required to conduct a variety of nefarious activities (it is believed that botnet herders lease botnets to various "customers" on a time-share basis). A control agent 253 pulls commands from an IRC (Internet Relay Chat) server 265 on a bullet-proof host or hosted by another drone in the botnet 132. A command and control center 261 provides a centralized command post that is either supported by a bullet-proof host or another drone in the botnet 132.

Returning back to FIG. 1, the UTMs 121 are arranged to detect adversaries, such as the bots in botnet 132, and collect their URLs and IP addresses. Such detection is typically performed reliably by observing or blocking attack attempts against the hosts in the customer networks 105. Such techniques for observing or blocking include, for example, observing spam sources, observing websites that host viruses, observing IP addresses that send distributed DoS attacks, and detecting command and control channel destinations to which the compromised hosts in the customer networks 105 connect.

UTMs 121 are arranged, in this illustrative example, to query a reputation service 140 through online connections 139 to check to see whether a particular URLs or IP addresses has a bad reputation (e.g., is blacklisted as a known spammer or has downloadable malicious content). Reputation service 140 may use any of a variety of methods for determining a reputation for a given URL or IP address. It is emphasized that the present arrangement for reducing false positives is intended to work with reputations provided by a service irrespective of the manner in which they are generated. For example, reputation services commonly generate reputations using a combination of manual and automated inspection techniques using information gathered through the use of crawlers that operate from the reputation service's own network, and honeypots/honey monkeys that are designed to trap attackers. Once a reputation is thus generated, it may then be subjected to the principles of the present reduction of false positives through the collection of overrides so that the fidelity of the reputation is adjusted up or down as assessments and/or overrides are received by the reputation service, as described below in the text accompanying FIG. 5.

Figure 3:
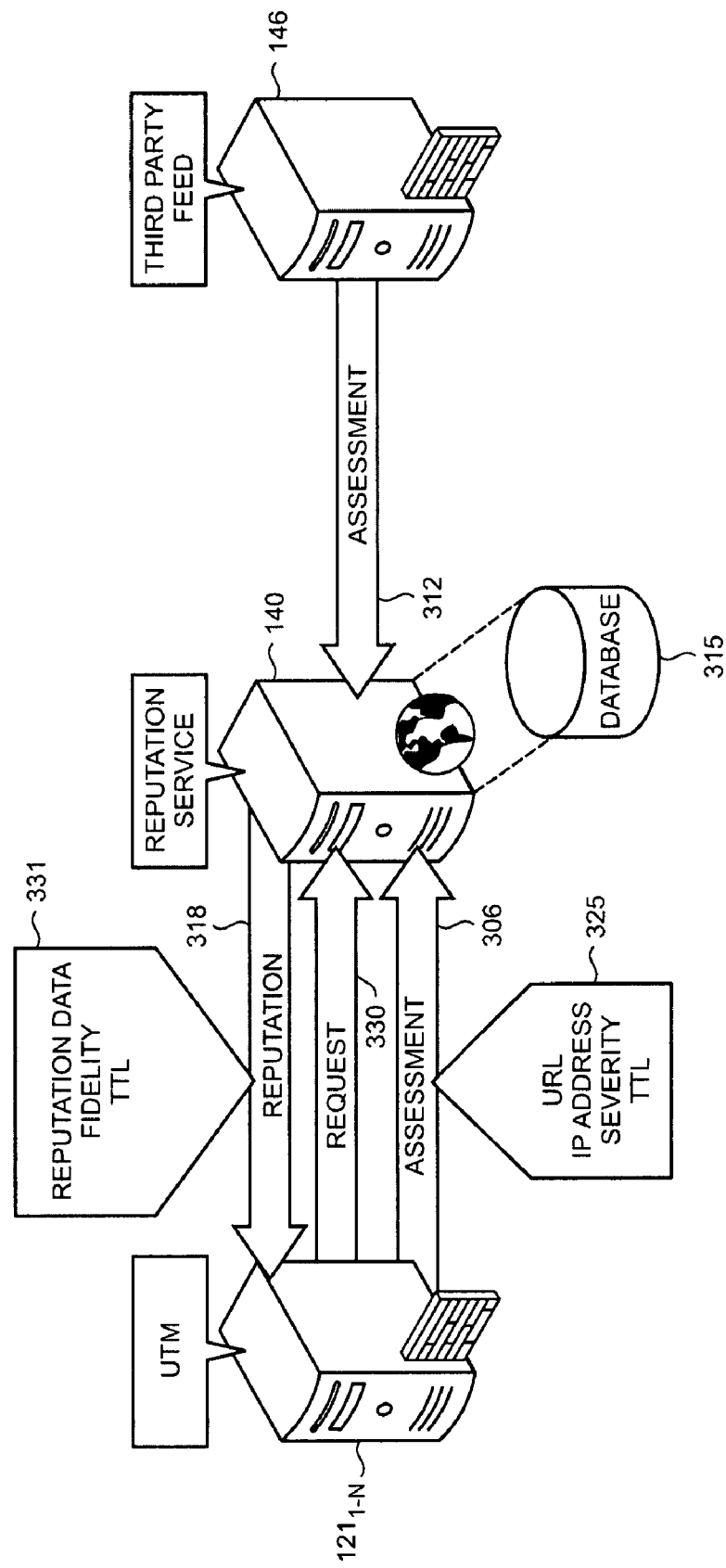
FIG. 3 shows the message flow associated with assessments between network security products and a reputation service.
Figure 4:
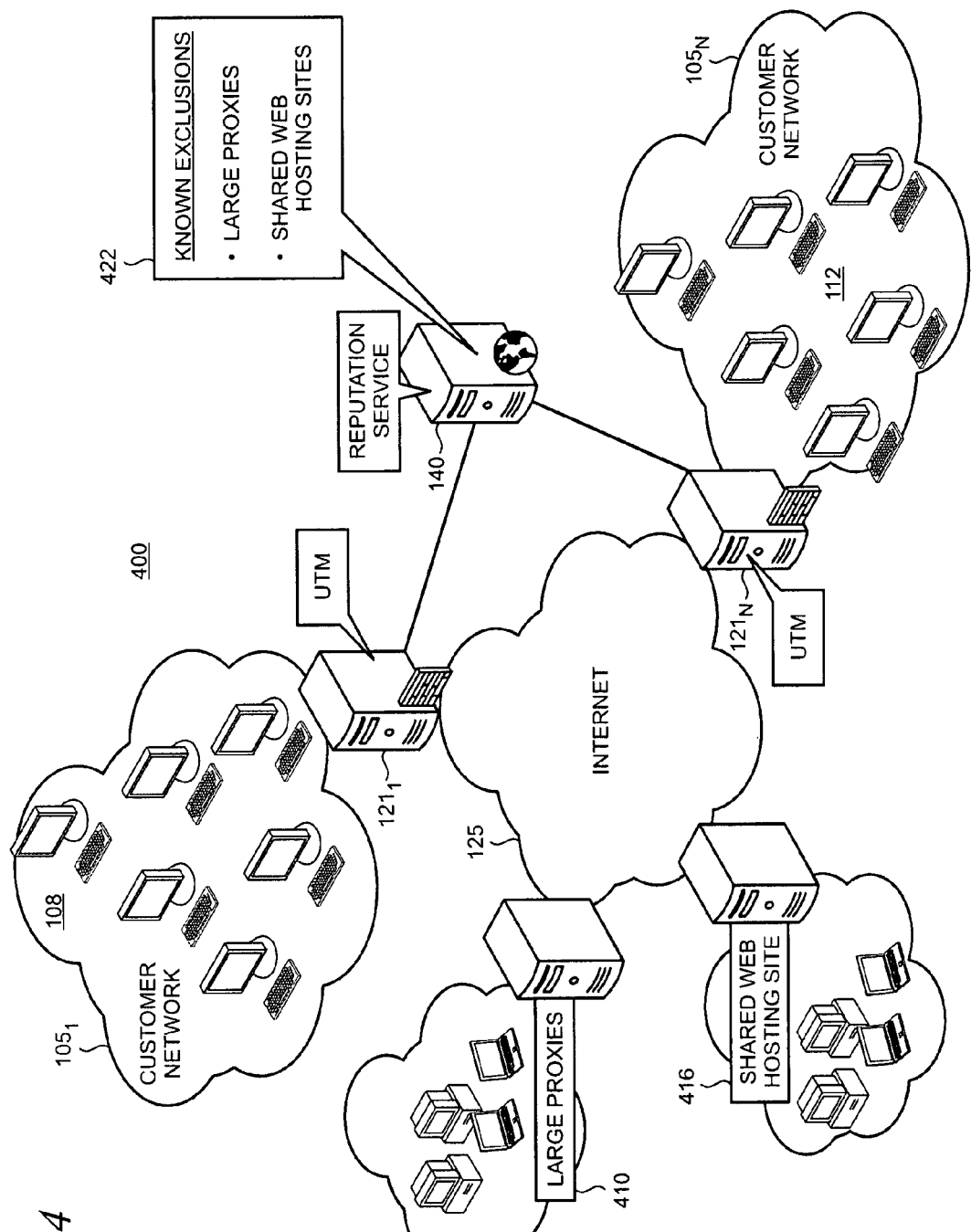
FIG. 4 shows an illustrative environment in which large proxies and shared web hosting are present.

One illustrative methodology for generating reputations is shown in FIGS. 3 and 4 and described in the accompanying text in which UTMs 121 are arranged to communicate with a reputation service 140 to report assessments of detected adversaries. The reputation service performs a number of correlations and validations on the received assessments to then generate a reputation which is sent to the UTMs and be used for blocking adversaries. Such illustrative methodology may be preferably used in some applications of the present arrangement.

In FIG. 3, UTMs 121 report assessments of detected adversaries via telemetry that it uploads to the reputation service 140. As UTMs 121 are commonly utilized by enterprises, businesses and corporations, they can thus number in the hundreds of thousands to provide a very broad array of distributed adversary detection sensors. However, it is emphasized that benefits of the present arrangement can be substantially realized even with a relatively small number of UTMs (e.g., a few dozen). In addition, assessments may be optionally collected from security products deployed in other networks, including home networks and other known resources, as collectively identified as third parties feeds 146 in FIG. 1.

As shown in FIG. 3, each of the plurality of UTMs 121$_{1-N}$ reports the detected attacks as part of an assessment 306 that is reported to the reputation service 140. The reputation service 140 collects all the assessments from the multiple UTMs 121, and optionally from assessment 312 from the third party feed 146 in order to generate a reputation 318, as discussed in detail below, which is then downloaded by the UTMs 121. Assessments are typically stored in database 315 that is operatively coupled to the reputation service 140, as shown.

There is a possibility that a hacker might create false assessments in an attempt to damage the credibility of the reputation service 140, or launch a DoS attack, for example on a legitimate website and falsely accuse it of participating in malicious attacks. To prevent reporting of such false assessments, the reputation service 140 authenticates the UTMs 121 making the reports through use of a unique customer identification or security certificate to prove that the reporting UTM is legitimate and not a hacker.

As indicated by reference numeral 325, an assessment, in this illustrative example, includes data fields which contain the URL or IP address of the detected adversary, a severity of the incident associated with the attack by the adversary, and a time-to-live ("TTL") value. The severity (e.g., low, medium, high, critical) describes the seriousness of an incident that is associated with the attack, which as noted above, can be both active and passive. For example, a host in customer network 105 (FIG. 1) might receive an e-mail containing a virus that is detected by the UTM or local anti-virus product and removed. The severity in the assessment 306 reported to the reputation service 140 could be "low," for example, given that the virus was detected and removed before it could cause any damage to the enterprise.

Each reported assessment has an assigned TTL value that defines the time interval over which the assessment is valid. Once the TTL expires, the assessment is no longer valid. The TTL is utilized in recognition that hackers can often quickly change the URL or IP addresses of the bots in their botnets. By using the TTL, the possibility is lessened for blocking a legitimate user who subsequently uses a URL or IP address after it has been abandoned by the hacker.

In this illustrative example, the default initial TTL value is four hours. However, if a UTM 121 detects the same adversary on a recurring basis, the TTL value in its subsequent reported assessments will be extended in time. Various types of algorithms may be used to extend the TTL value according to the needs of a specific application of the present arrangement. For example, an exponentially increasing or geometrically increasing algorithm can be applied to double each TTL value with each recurring detection (e.g., 4, 8, 16 hours . . . ).

As noted above, the reputation service 140 uses the collected assessments from the UTMs 121 to generate the reputation 318. To do this, the reputation service correlates the collected assessments to derive a fidelity (i.e., level of confidence) that will be associated with the reputation 318. In some implementations, such reputation fidelity can be reported back to the UTMs 121 with various levels, for example, low, medium, or high fidelity. Alternatively, fidelity can be arranged in a binary fashion (i.e., a reputation has sufficient fidelity to be relied upon, or has no fidelity). In either case, in accordance with the principles herein, a set or predetermined amount of fidelity must be present before a reputation may be used by a UTM to block traffic.

Various techniques or algorithms may be used to establish fidelity and the local rules governing assessment use may vary, but the general principle applied by all is that multiple, distinct UTMs (i.e., UTMs operating on different customer networks) must corroborate an adversary so that no single assessment is used to generate a reputation at the reputation service 140. For example, one technique would be to require a minimum number, such as 10, valid (i.e., having unexpired TTLs) assessments identifying the same adversary received from distinct UTMs, in order for the reputation service 140 to generate a reputation 318 having high fidelity. In this example, only high fidelity reputations are allowed to be used by a UTM 121 to block an adversary. In another example, a low fidelity reputation is generated when between one and five assessments identifying the same adversary are received from distinct UTMs. But in this example a given UTM 121 might apply a different local rule to block the adversary associated with the low fidelity reputation, but only if the UTM also detects the adversary Thus, corroboration from an outside source, even if it is low fidelity, is sufficient evidence when combined with the UTM's own observations to warrant taking a blocking action. It may also be desirable to use a fidelity algorithm that adjusts according to the severity of the reported incidents. For example, high or critical severity incidents that have the potential to cause greater harm might require fewer assessments from multiple, distinct sources to generate a high-fidelity reputation than when the severity is lower.

By requiring correlation of assessments from multiple distinct sources before issuing a reputation, the present arrangement prevents a hacker from simply installing a pirated UTM in order to influence a reputation. This provides a measure of security that may be used in addition to the use of authentication of assessment sources. Should a hacker attempt to provide assessments including fraudulent or misleading data, the fact that such assessments are not corroborated by other UTMs 121 can be used as a justification for revoking the certificate for the pirated UTM.

In some applications of the present arrangement, a UTM 121 sends a request 330 to the reputation service when it encounters an unknown URL or IP address to check the reputation of the URL or IP address before allowing access to the URL or accepting traffic from the IP address. In other applications, reputations are generated and sent to the UTMs 121 whenever a sufficient number of assessments are collected and correlated by the reputation service 140 irrespective of an explicit request.

As indicated by reference numeral 331 in FIG. 3, the reputation 318 that is downloaded by the UTM 121 includes, in this illustrative example, data fields containing reputation data, fidelity, and an optionally utilized TTL value. The reputation data can provide any of a variety of information that describes the reputation of the URL or IP address. This can be a simple binary indication (i.e., the URL or IP address has a good or bad reputation), or it can include more detailed reputation information, for example an IP address is known for transmitting spam, or phishing attacks, or a URL is known to include potentially threatening downloadable content, etc. In some cases, it may be desirable to include the URL or IP address of the adversary in the reputation as a part of a blacklist that is provided to a UTM. However, the particular reputation data that is provided to a UTM will typically be based on the requirements of a specific application of the present arrangement.

The fidelity field contains a fidelity indicator such as low, medium, high etc. The fidelity field can be optionally eliminated in some implementations. It is typically not used in cases where reputations are binary in nature and are thus only generated and sent when the derived fidelity reaches a predetermined threshold (and which would make reporting the actual fidelity value somewhat meaningless). The optionally-utilized TTL value in a reputation may similarly vary according to the requirements of a specific application. For example, a TTL value for the reputation 318 might be selected to be equal to the largest TTL value contained in a received assessment and a UTM 121 should block the URL or IP address only so long as the TTL remains valid. In other illustrative examples, no TTL is used and the reputation stays valid until it is explicitly revoked.

FIG. 4 shows an illustrative environment 400 in which the presence of large proxies and NAT (network address translation) devices, identified by reference numeral 410, present a special case, as do shared web hosting sites 416. In the first case, large proxies/NAT arrangements such as America Online ("AOL®") can have many thousand computers, some of which may be infected hosts that function as bots in a botnet. Thus, simply blocking the proxy will block not only adversaries, but legitimate users as well and create undesirable false positives. To address this special case, a list of known exclusions 422 is maintained by the reputation service 140. The exclusion list includes known large proxies which will be used by the reputation service 140 so that assessments identifying adversaries with IP addresses of the known large proxies will be ignored. In some implementations of the present arrangement, known large proxies can register with the reputation service 140 and be notified when attacks from hosts using their proxy are detected. The known large proxy can then be given a period of time to fix the problem before the proxy is blocked. In addition, an HTTP extension that is derived from an IP address can be used by the known large proxy as an ID for the compromised host to thereby allow a reputation to be selectively targeted to that host.

For the second special case of shared web hosting sites like MySpace® and MSN Hotmail™, the known exclusion list 422 includes a white list of URLs associated with shared web hosting sites that will not be blocked since those sites are shared by many users, including legitimate users. In some implementations, it may be possible to block certain sites by path, but not by domain of the shared web hosting site.

It is possible that some customers operating networks that are engaged in the present arrangement with a reputation service may have privacy concerns and not want to disclose information on incidents and attacks. Accordingly, as an optional feature, instead of reporting actual URLs and IP addresses in an assessment 306 (FIG. 3), information derived from the URL and/or IP address is reported. For example, the URLs and IP addresses can be subjected to a conventional hash algorithm such as CRC32, SHA-1 or MD-5 before being uploaded to the reputation service 140. Hashing the URLs and IP addresses will prevent observation, by the reputation service 140 or any middleman between the UTM and the reputation service 140, of the particular URLs or IP addresses that were responsible for attacking a particular customer network. In order to prevent recovery of the information input into the hash function through use of a rainbow table, conventional cryptographic measures may be utilized such as increasing a hash bit number, or using a dynamic salt value (i.e., random bits) which is added to the hash, etc.

Figure 5:
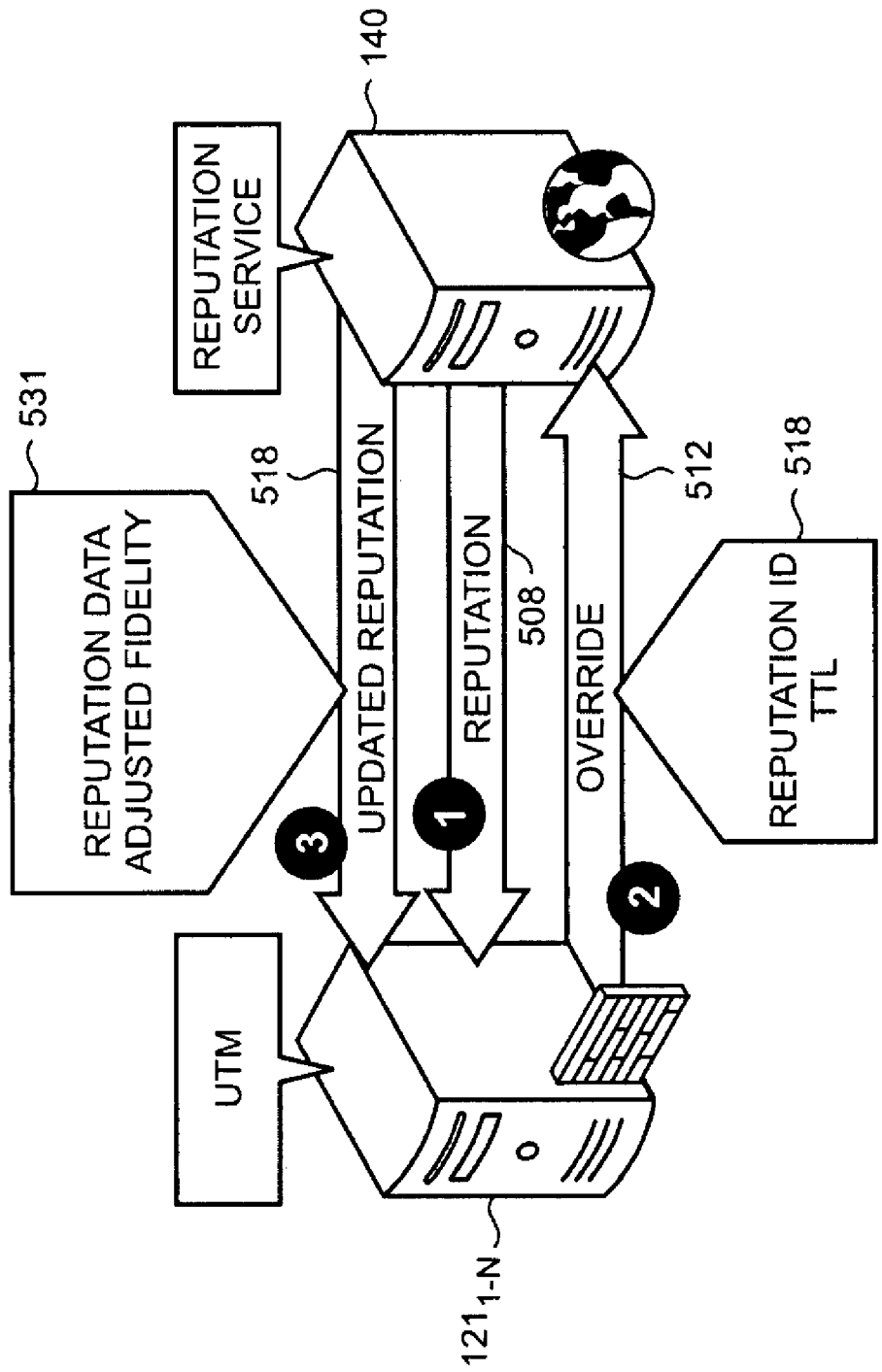
FIG. 5 shows the message flow associated with overrides between network security products and a reputation service.

Turning now to the present arrangement for reducing the occurrence of false positives through the collection of overrides from customer deployments, FIG. 5 shows the message flow associated with overrides between the UTMs 121 and the reputation service 140. The reputation service 140 provides a reputation 508 to UTMs 121. Reputation 508 may be generated using the correlated assessments shown in FIGS. 3 and 4 and described in the accompanying text. However, it is emphasized that other methodologies and techniques for generating reputations may also be used depending on the requirements of a specific application. Reputation 508 may be provided in response to a request or query, or provided at the initiative of the reputation service 140. Reputation 508 includes fields for reputation data, fidelity and an optional TTL value.

In this illustrative example, an administrator at a network in which a UTM 121 is deployed is aware that a particular URL or IP address is blacklisted according to the reputation 508 that was received by the UTM 121. However, the administrator recognizes the blacklisting is a false positive and therefore authorizes hosts in the enterprise to access the URL or receive traffic from the IP address. UTM 121 then generates an override 512 that is reported to the reputation service 140.

As indicated by reference numeral 518, the override identifies the reputation being overridden and includes a TTL value that sets the length of time for which the override is valid. The TTL value is needed to deal with the fact that hackers can quickly change a URL or IP address of the bots under their control. The default TTL value can very depending on the requirements of a specific application. In this illustrative example, the TTL value for an override is 30 days.

The reputation service 140 collects, via telemetry, overrides from the multiple UTMs 121 over time. To prevent reporting of false overrides by hackers in an attempt to improve or clean its own reputation, the reputation service 140 authenticates the UTMs 121 making the reports through use of a unique customer identification or security certificate to prove that the reporting UTM is legitimate.

The reputation service 140 adjusts the fidelity of a given reputation according to the number of UTMs 121 that report an override for the same reputation. Only when a certain minimum number of valid overrides (i.e., those with an unexpired TTL) are collected for the same reputation will the reputation service 140 accept an override and adjust the fidelity of the reputation at issue. Generally, as more valid overrides are collected, the reputation service 140 will adjust the fidelity of the reputation to be down to reflect greater confidence that the override of that reputation is justified. That is, as more customers override a reputation, confidence that a blacklisting is accurate goes down. Conversely, a decrease in the number of valid overrides will cause the fidelity of the reputation to be adjusted up to reflect less confidence in the overrides and more confidence that a blacklisting is correct. For example, 10 valid overrides of a reputation could decrease its fidelity from high to medium, and 20 valid overrides could decrease the fidelity to low. If additional overrides are not received, and as TTLs of the collected overrides expire, the fidelity of the reputation will be adjusted upward, for example from low to medium.

If a sufficient number of overrides are reported to justify an adjustment in the fidelity of a reputation, the reputation service 140 generates an updated reputation 531 which reflects the adjusted fidelity. The updated reputation 531 is typically distributed to all the UTMs 121 that use the reputation service 140. The UTMs 121 can use the updated reputation 531 in order allow traffic to and from legitimate computers which would otherwise be blocked as false positives. In some applications of the present arrangement, the fidelity is arranged as a binary (i.e., "go" or "no go") value to indicate if a reputation for a given URL or IP address is overridden and therefore can be accessed by a UTM 121. In other applications, the fidelity may take on a plurality of different values and the minimum fidelity value to enable a reputation override may be determined by the reputation service 140 or locally by a UTM 121.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operating a reputation service, the method comprising the steps of:
    receiving by a reputation service executing on at least one computer an override of a reputation from a security product deployed at a network, the override identifying the reputation and containing at least a time-to-live value that defines a time interval over which the override is valid;
    collecting by the reputation service the received override with other overrides of the reputation received from other distinct networks, the other overrides identifying the reputation and containing at least a corresponding time-to-live value that defines a corresponding time interval over which the override is valid; and
    adjusting by the reputation service a confidence level that is associated with the reputation responsive to determining that the number of collected overrides having an unexpired time-to-live value exceeds a predetermined threshold.

2. The method of claim 1 including a further step of authenticating the override using one of ID or security certificate.

3. The method of claim 1 in which the security product is one of firewall product or UTM product.

4. The method of claim 1 including a further step of generating an updated reputation only when multiple valid overrides are received from distinct networks, each of the multiple valid overrides identifying the reputation.

5. The method of claim 4 in which the confidence level is expressed by a fidelity of the reputation that decrease as a number of received valid overrides increases.

6. The method of claim 1 in which the reputation is generated by the reputation service.

7. The method of claim 6 in which the reputation is generated responsively to a plurality of assessments of detected adversaries reported by multiple distinct customers.

8. The method of claim 1 in which the override identifies a reputation to be overridden by identifying a Uniform Resource Locator (URL) or Internet Protocol (IP) address.

9. A method for reporting overrides to a reputation service executing on at least one computer and processing of same by the reputation service, the method comprising the steps of:
    generating by a security product executing on at least one computer and associated with a network an override upon detection of a false positive reputation;
    populating by the security product the override with data including a time-to-live value that defines a time interval over which the override is valid, and an ID value that uniquely identifies the false positive reputation;
    sending the override as telemetry to the reputation service;
    collecting by the reputation service the override with other overrides of the false positive reputation received from other distinct networks, the other overrides also including a corresponding time-to-live value and an ID value that identifies the false positive reputation; and
    adjusting by the reputation service a fidelity that is associated with the false positive reputation responsive to determining that the number of collected overrides having an unexpired time-to-live value exceeds a predetermined threshold, the fidelity expressing a confidence level in the false positive reputation.

10. The method of claim 9 including a further step of receiving by the security product an updated reputation which includes the adjusted fidelity associated with the false positive reputation.

11. The method of claim 10 including a further step of enabling by the security product communication with an object responsively to the updated reputation.

12. The method of claim 11 in which the object is one of URL or IP address.

13. A method for minimizing a false positive reputation for a resource, the method comprising the steps of:
    communicating by a reputation service executing on at least one computer with a plurality of customer networks, each customer network including one or more security products that are arranged for i) blocking traffic to the resource in response to a reputation and an associated confidence level, the reputation and associated confidence level being assigned to the resource by the reputation service based both on a number of reported incidents received about the object from the plurality of customer networks and a severity level associated with each reported incident, and ii) having the blocking be negated through overrides by an administrator of the customer network, the overrides identifying the resource and containing at least a time-to-live value that defines a time interval over which the override is valid;
    correlating the overrides from the plurality of customer networks by the reputation service; and
    adjusting the confidence level for the reputation by the reputation service responsive to determining that a number of the correlated overrides from the plurality of customer networks that have an unexpired time-to-live value exceeds a predetermined threshold.

14. The method of claim 13 in which the resource comprises one of URL or IP address.

15. The method of claim 13 in which the communicating includes receiving telemetry data.

16. The method of claim 13 in which the confidence level comprises fidelity.

17. The method of claim 13 including a further step of providing an updated reputation to one or more of the customer networks after performing the step of adjusting.

* * * * *